United States Patent
Yamada et al.

(12) 
(10) Patent No.: US 9,612,779 B1
(45) Date of Patent: Apr. 4, 2017

(54) IMAGE FORMING APPARATUS

(71) Applicant: FUJI XEROX CO., LTD., Tokyo (JP)

(72) Inventors: Kosuke Yamada, Kanagawa (JP); Kunihiko Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/133,659

(22) Filed: Apr. 20, 2016

(30) Foreign Application Priority Data

Dec. 18, 2015 (JP) ................................ 2015-247197

(51) Int. Cl.
*G06F 3/12* (2006.01)
*G06K 15/02* (2006.01)
*G06K 15/14* (2006.01)

(52) U.S. Cl.
CPC ............ *G06F 3/121* (2013.01); *G06F 3/1234* (2013.01); *G06F 3/1243* (2013.01); *G06K 15/024* (2013.01); *G06K 15/027* (2013.01); *G06K 15/14* (2013.01)

(58) Field of Classification Search
CPC .... G06F 3/1243; G06K 15/024; B41J 11/008; B41J 3/4075
USPC ............. 358/1.9, 1.5, 1.18, 1.12; 101/128.21
See application file for complete search history.

(56) References Cited

U.S. PATENT DOCUMENTS

2008/0074453 A1*  3/2008  Furukawa .............. B41J 2/2142
                                                                347/14

FOREIGN PATENT DOCUMENTS

JP       2012-215608 A    11/2012
JP       2015-025920 A     2/2015

* cited by examiner

*Primary Examiner* — Jamares Q Washington
(74) *Attorney, Agent, or Firm* — Oliff PLC

(57) ABSTRACT

An image forming apparatus includes: a setting part that sets image data; an image forming part that forms an image based on the image data on a base member of a recording material; a groove forming part having an opposing member mounted on a portion facing the base member of having an image, the groove forming part urging a projecting part against the recording material to form a groove in the base member; an acquisition part that acquires a type of the opposing member; a storage part that stores a content of the image data and the type of the opposing member in an associated manner; and a control part that controls an image forming operation, on the basis of the association between the content of the image data and the type of the opposing member stored in the storage part in an associated manner.

7 Claims, 12 Drawing Sheets

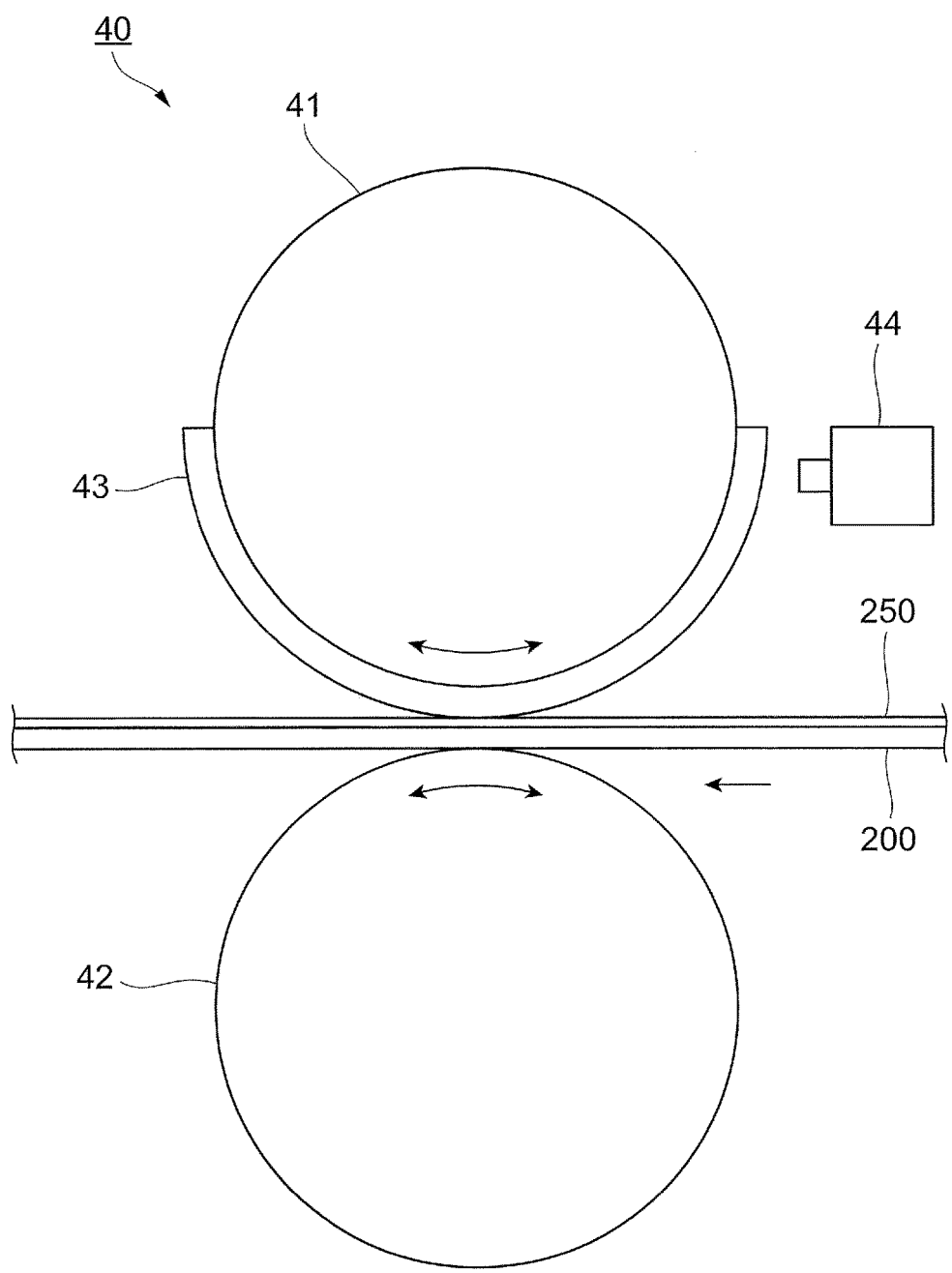

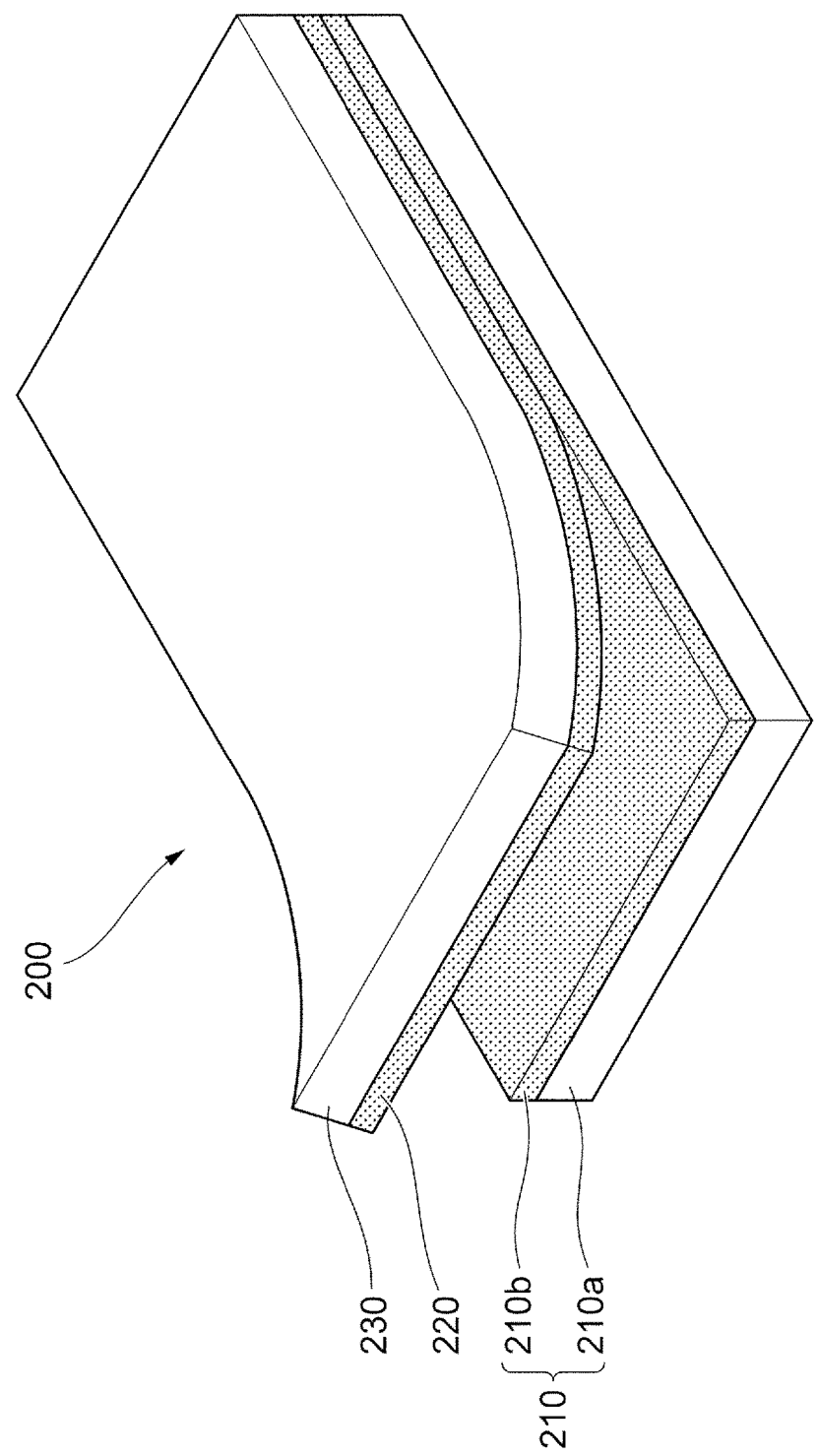

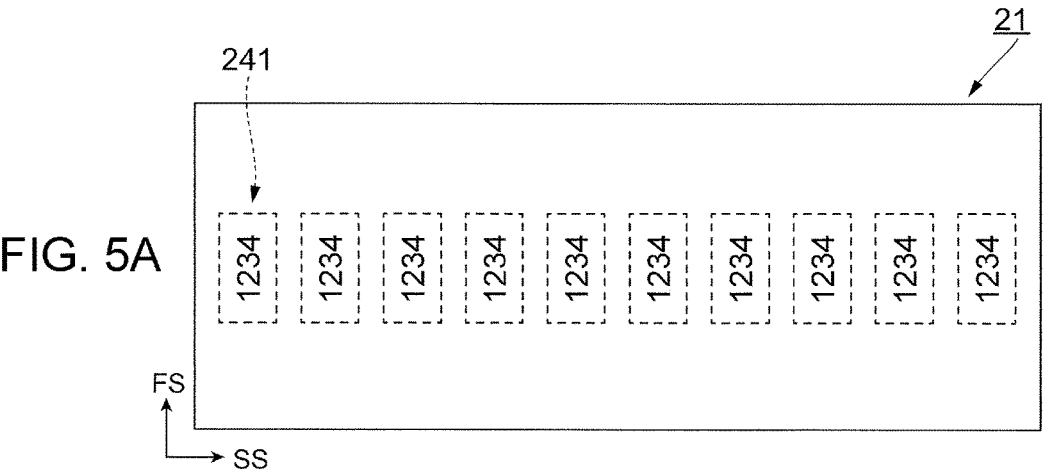
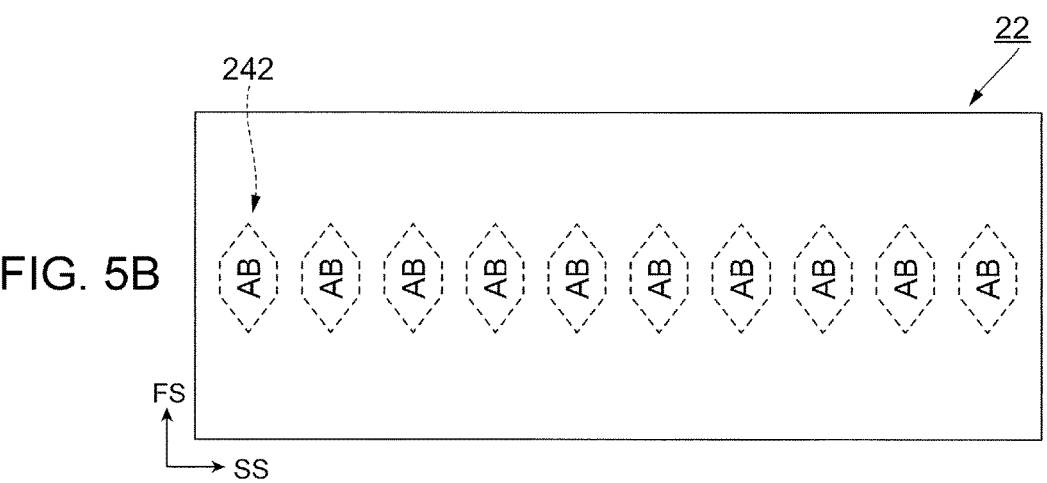
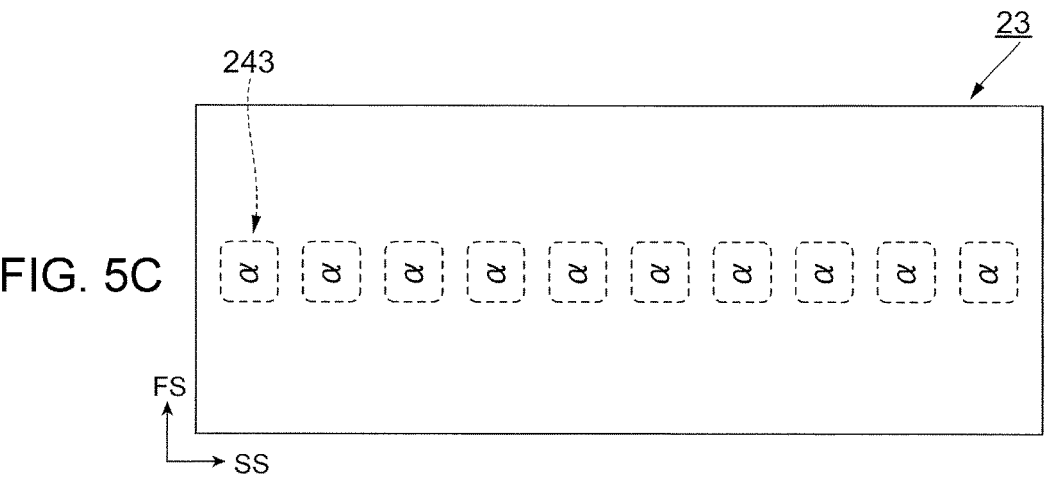

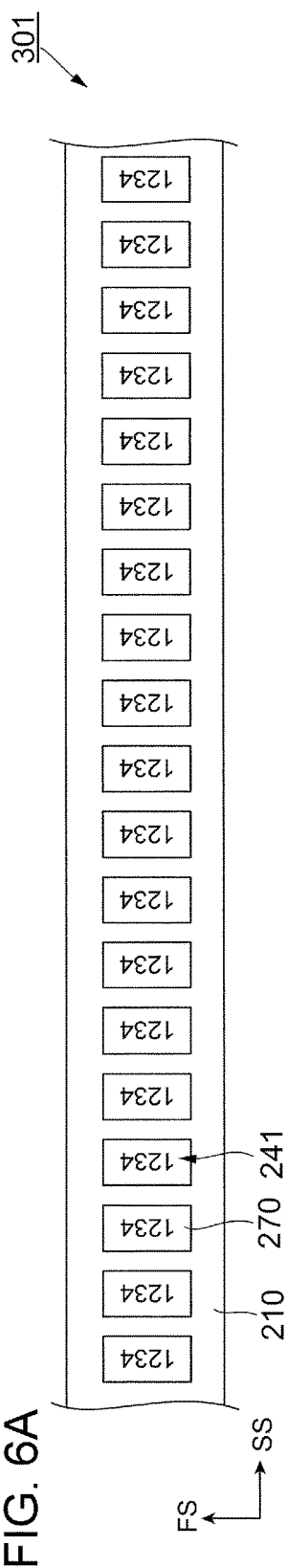
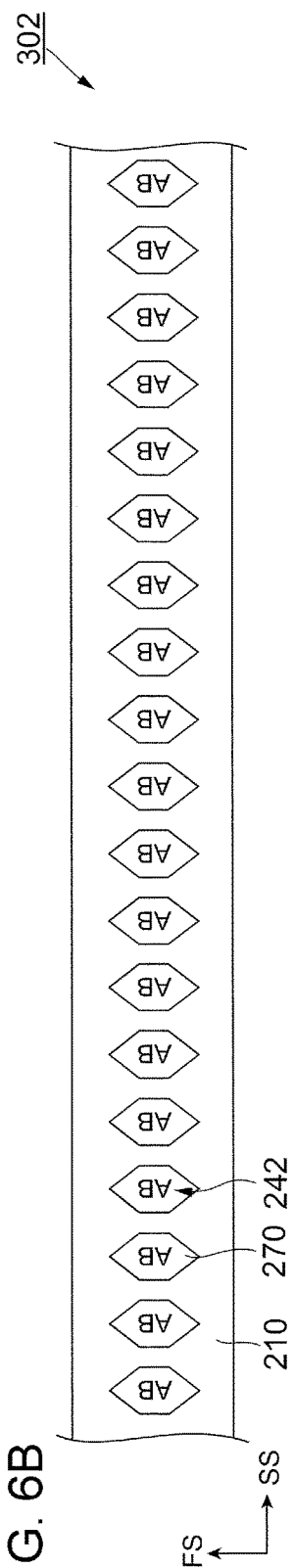
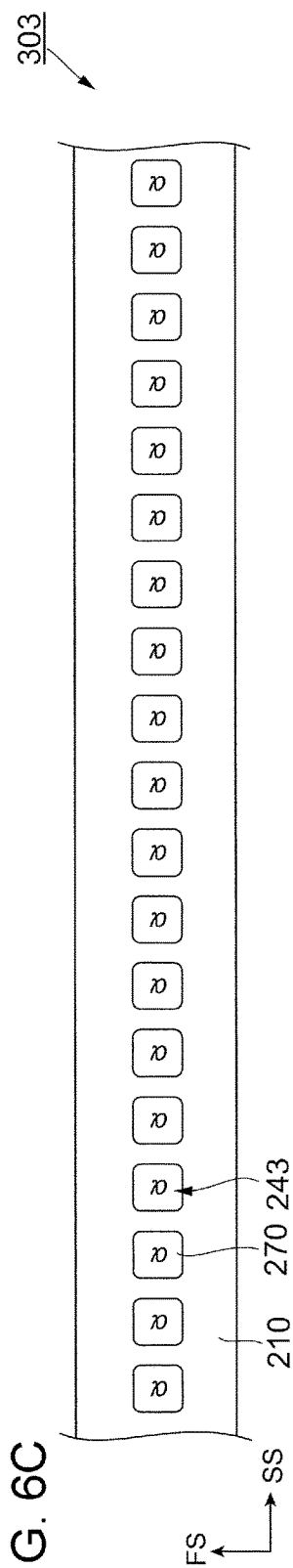

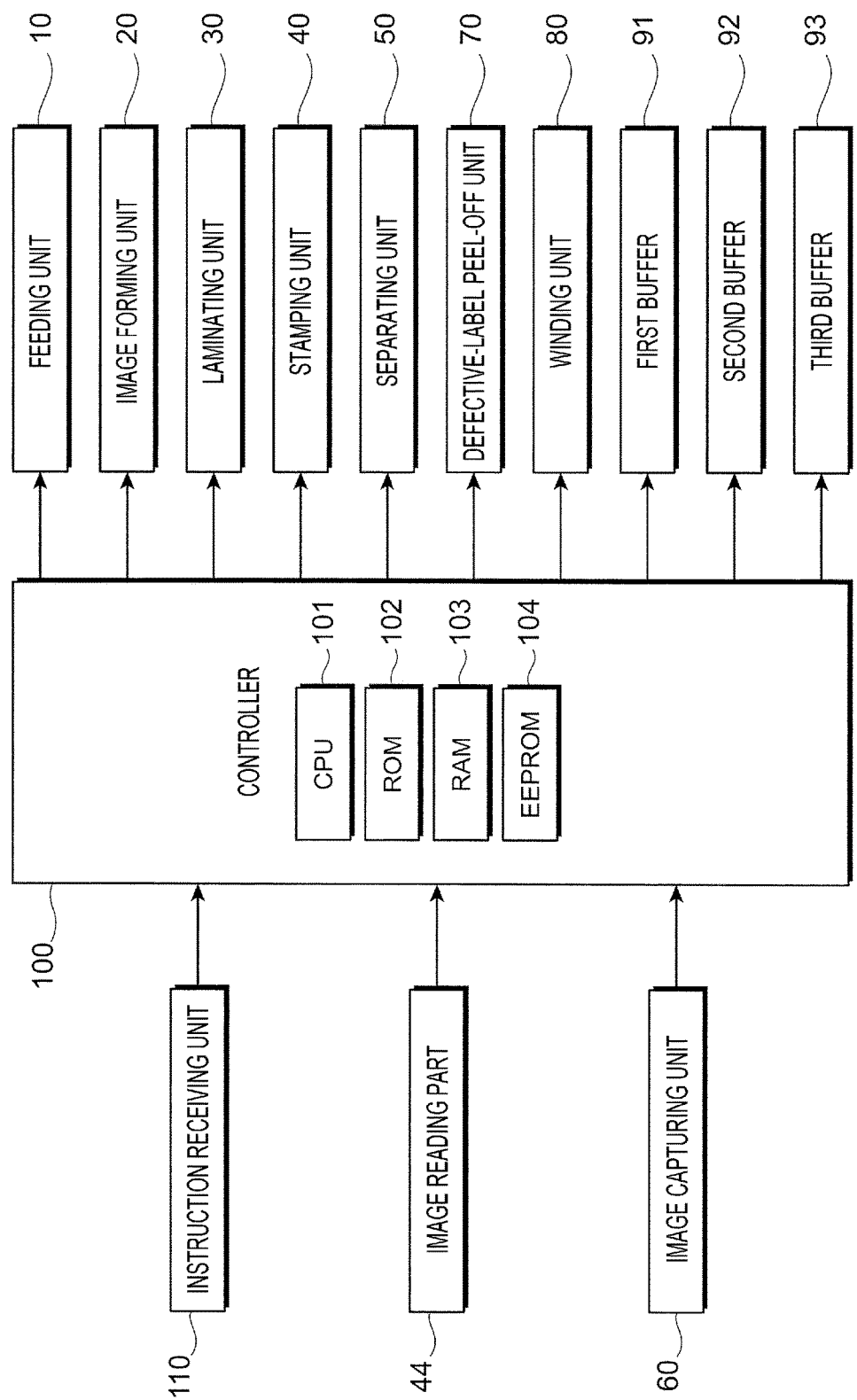

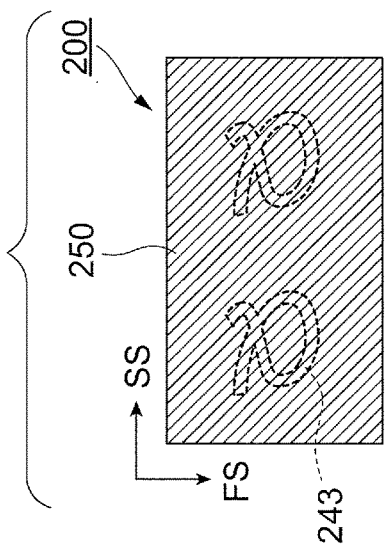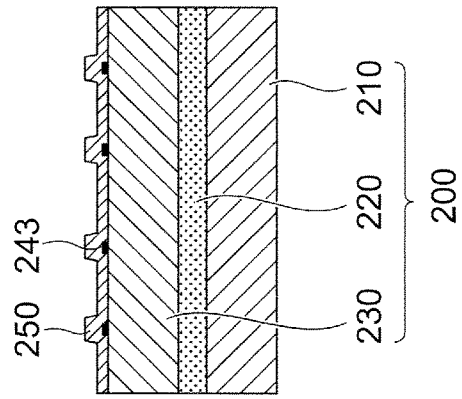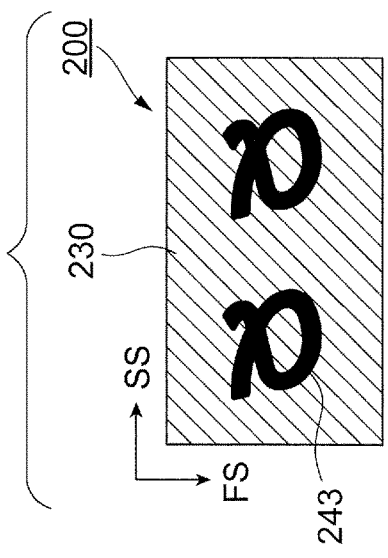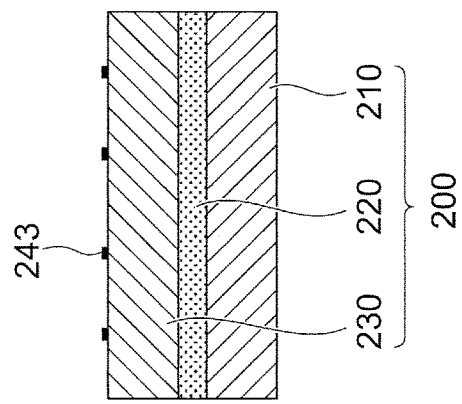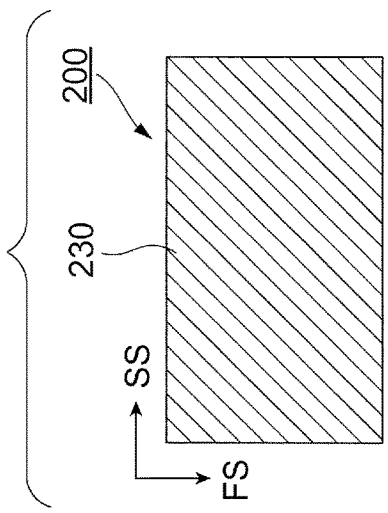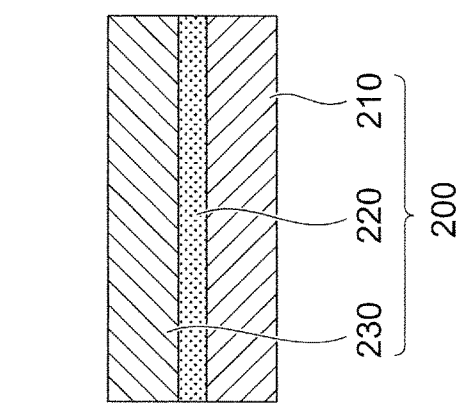

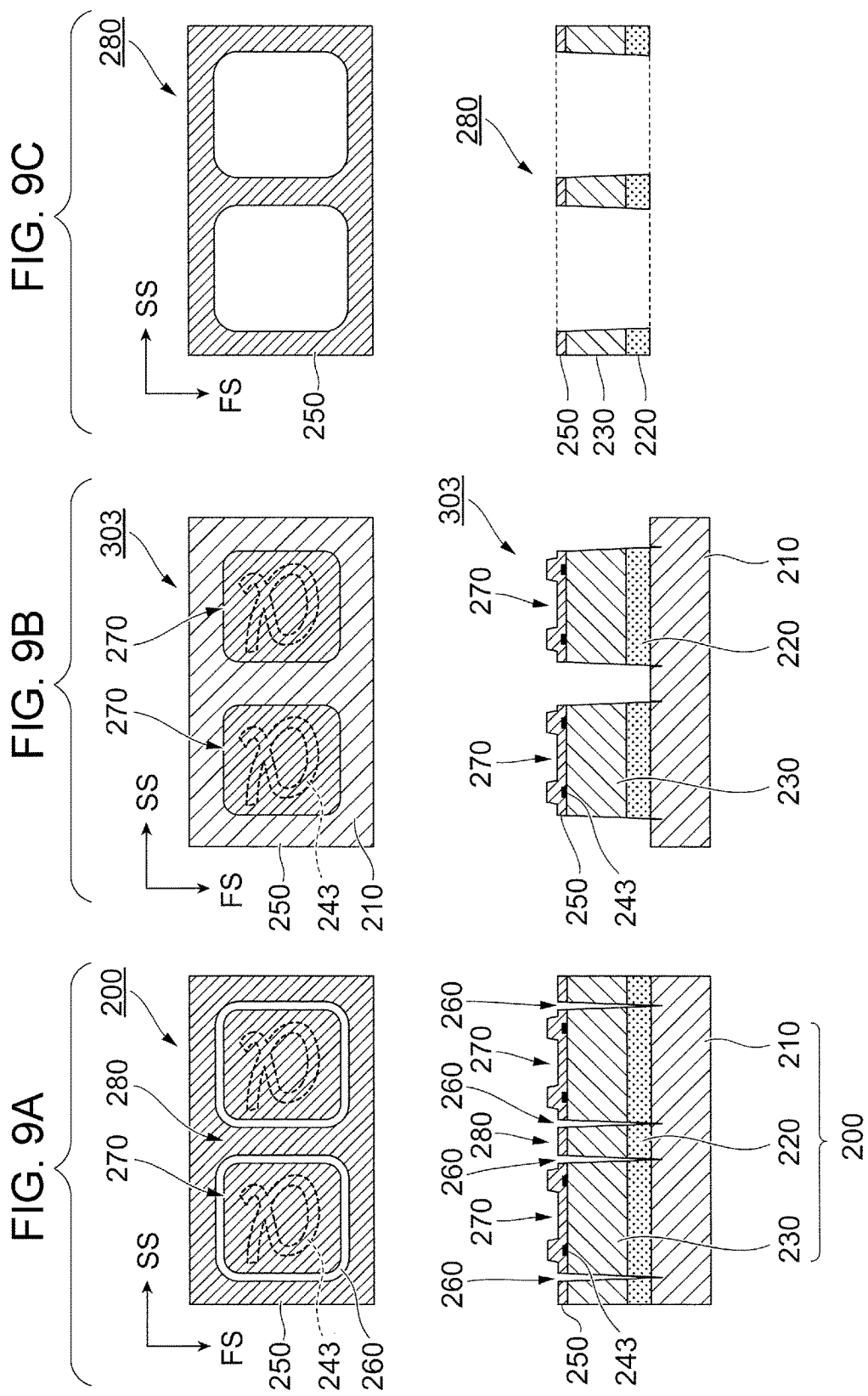

FIG. 11

| LABEL ID | PRINT IMAGE ID | DIE PLATE ID | INSPECTION IMAGE ID | USE |
|---|---|---|---|---|
| L001 (FIRST LABEL) | P001 (FIRST LABEL IMAGE) | D001 (FIRST DIE PLATE) | I001 (FIRST INSPECTION IMAGE) | PRODUCT X |
| L002 (SECOND LABEL) | P002 (SECOND LABEL IMAGE) | D002 (SECOND DIE PLATE) | I002 (SECOND INSPECTION IMAGE) | PRODUCT Y |
| L003 (THIRD LABEL) | P003 (THIRD LABEL IMAGE) | D003 (THIRD DIE PLATE) | I003 (THIRD INSPECTION IMAGE) | PRODUCT Z |

IMAGE FORMING APPARATUS

CROSS-REFERENCE TO RELATED APPLICATIONS

This application is based on and claims priority under 35 USC 119 from Japanese Patent Application No. 2015-247197 filed Dec. 18, 2015.

BACKGROUND

Technical Field

The present invention relates to an image forming apparatus.

SUMMARY

According to an aspect of the invention, there is provided an image forming apparatus including: a setting part that sets image data; an image forming part that forms an image based on the image data on a base member of a recording material formed by attaching the base member to a backing sheet; a groove forming part having an opposing member mounted on a portion facing the base member of the recording material that has an image formed by the image forming part, the groove forming part urging a projecting part formed on the opposing member against the recording material to form a groove in the base member; an acquisition part that acquires a type of the opposing member mounted on the groove forming part; a storage part that stores a content of the image data and the type of the opposing member in an associated manner; and a control part that controls an image forming operation performed by the image forming part, on the basis of the association between the content of the image data and the type of the opposing member stored in the storage part in an associated manner.

BRIEF DESCRIPTION OF THE DRAWINGS

Exemplary embodiment of the present invention will be described in detail based on the following figures, wherein:

FIG. 2 shows the configuration of a stamping unit provided in the label printer;

FIG. 4 shows the configuration of a label base used in the label printer;

FIGS. 5A to 5C show configuration examples of a label-forming image used in the image forming unit;

FIGS. 6A to 6C show configuration examples of a multi-label sheet obtained by using the label printer.

FIG. 7 is a block diagram of a control system of the label printer;

FIGS. 8A to 8C are diagrams for explaining a process of producing a third multi-label sheet by using the label printer;

FIGS. 9A to 9C are diagrams for explaining the process of producing the third multi-label sheet by using the label printer, as continued from FIGS. 8A to 8C;

FIG. 11 shows a configuration example of a label information table; and

DETAILED DESCRIPTION

An exemplary embodiment of the present invention will be described in detail below with reference to the attached drawings.

Configuration of Label Printer

Figure 1:
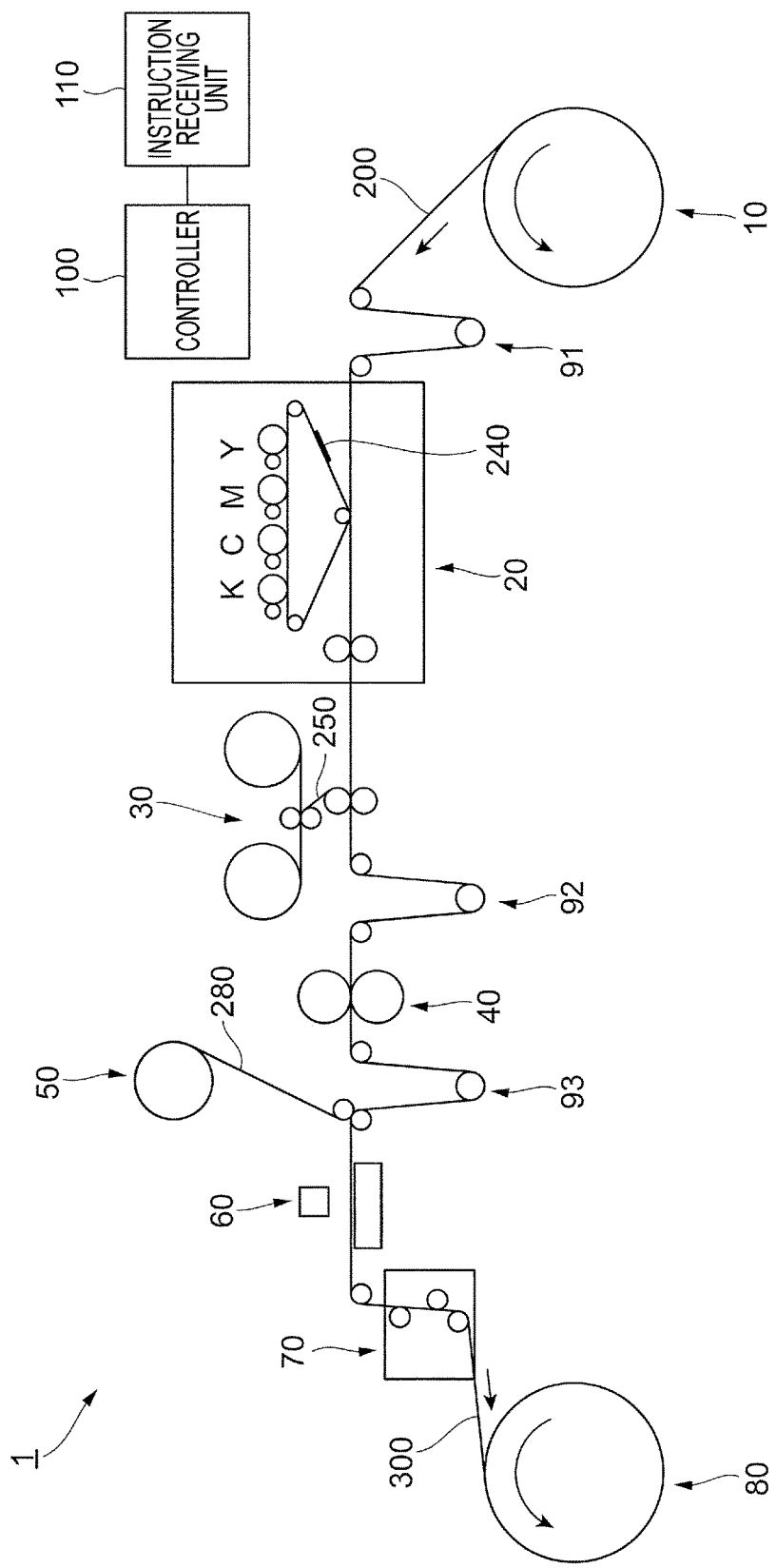
FIG. 1 shows the overall configuration of a label printer according to this exemplary embodiment.

FIG. 1 shows the overall configuration of a label printer 1 according to this exemplary embodiment.

The label printer 1 includes a feeding unit 10, an image forming unit 20, a laminating unit 30, a stamping unit 40, a separating unit 50, an image capturing unit 60, a defective-label peel-off unit 70, and a winding unit 80. The label printer 1 also includes a first buffer 91, a second buffer 92, and a third buffer 93. Furthermore, the label printer 1 includes a controller 100 and an instruction receiving unit 110.

The feeding unit 10 supports a roll of a label base 200, from which a multi-label sheet 300 is formed by the label printer 1. The feeding unit 10 feeds the label base 200 to the image forming unit 20 by rotating the base material roll counterclockwise in FIG. 1. In this example, the label base 200 is supported by the feeding unit 10 such that an image forming surface thereof faces outside.

The image forming unit 20, serving as an example image forming part, forms print images 240 on one side (i.e., the image forming surface or the front surface) of the label base 200 sent from the feeding unit 10. The method for forming the print images 240 on the image forming unit 20 may be either forme-based printing, which uses formes, or formeless printing, which does not use formes. However, the detail of the print images 240 may be easily changed in the formeless printing, which does not use formes, as there is no need to prepare formes, compared with the forme-based printing, which uses formes. Furthermore, when formeless printing is employed to form print images 240 in the image forming unit 20, either an electrophotographic system or a system other than the electrophotographic system (for example, an ink jet method) may be used. In this exemplary embodiment, an electrophotographic system for forming a full-color image by using yellow (Y), magenta (M), cyan (C), and black (K) toners is employed to form print images 240 in the image forming unit 20. However, the print images 240 do not need to be full-color images, but may be monochrome images.

The laminating unit 30 attaches a laminate film 250 that is transparent in the visible range to the surface of the label base 200 on which the print images 240 are formed, after the label base 200 has passed through the image forming unit 20. The laminate film 250 in this exemplary embodiment is formed by providing an adhesive layer on one side of a plastic film that is transparent in the visible range.

The stamping unit 40, serving as an example groove forming part, forms, by die cutting, grooves 260 (see FIG. 9) in the label base 200 (i.e., the laminated member composed of the label base 200, the print images 240, and the laminate film 250) having the print images 240 formed by the image forming unit 20 and having the laminate film 250 attached by the laminating unit 30, from the side to which the laminate film 250 is attached. At this time, the grooves 260 are formed so as to penetrate through the laminate film 250 but not the label base 200. As a result of forming the grooves 260, the laminated member that has passed through the stamping unit 40 is structurally separated into the multi-label sheet 300, which includes multiple labels 270 (see FIG. 6), and a waste label 280, but they are maintained in an integrated state by the label base 200.

The separating unit 50, serving as an example removing part, separates, into the multi-label sheet 300 and the waste label 280, the laminated member having the grooves 260 (see FIG. 9) formed as the laminated member passes through the stamping unit 40. The separating unit 50 winds and stores the separated waste label 280.

The image capturing unit 60, serving as an example image capturing part, captures an image of the side of the multi-label sheet 300, separated from the laminated member as it passes through the separating unit 50, having the laminate film 250 (i.e., the side having the print images 240). The image capturing unit 60 is formed of a digital camera that uses a charge-coupled device (CCD) image sensor or a complementary MOS (CMOS) image sensor. The image captured by the image capturing unit 60 is used by the controller 100 to inspect the products (the labels 270, see FIG. 6).

The defective-label peel-off unit 70, serving as an example peel off part, peels off (removes), from the multi-label sheet 300 that has passed through the image capturing unit 60, the labels 270 (see FIG. 6) that have been determined to be defective, on the basis of the result of the inspection performed by the controller 100 using the image of the multi-label sheet 300 captured by the image capturing unit 60.

The winding unit 80 winds, in a roll, the multi-label sheet 300, from which the labels 270 (see FIG. 6) that have been determined to be defective are peeled off by the defective-label peel-off unit 70, and supports the multi-label sheet 300 as a product roller. In this example, the multi-label sheet 300 is supported by the winding unit 80 such that the labels 270 faces outside.

The first buffer 91, located between the feeding unit 10 and the image forming unit 20, functions as a buffer for absorbing the difference in transportation speed of the label base 200 between the feeding unit 10 and the image forming unit 20, while suppressing loosening of the label base 200. The second buffer 92, located between the laminating unit 30 and the stamping unit 40, functions as a buffer for absorbing the difference in transportation speed of the label base 200 between the laminating unit 30 and the stamping unit 40, while suppressing loosening of the label base 200. The third buffer 93, located between the stamping unit 40 and the separating unit 50, functions as a buffer for absorbing the difference in transportation speed of the label base 200 between the stamping unit 40 and the separating unit 50, while suppressing loosening of the label base 200.

The controller 100, serving as an example acquisition part, control part, and determination part, controls the operation of the components of the label printer 1. The instruction receiving unit 110, serving as an example setting part, receives instructions from a user, with respect to the operation of the label printer 1.

Configuration of Stamping Unit

FIG. 2 shows the configuration of a stamping unit 40 provided in the label printer 1.

The stamping unit 40 according to this exemplary embodiment includes a first roller 41 disposed so as to face the laminate film 250 of the laminated member, which is composed of the label base 200, the print images 240 (see FIG. 1), and the laminate film 250, and a second roller 42 is disposed so as to face the label base 200 (i.e., the second roller 42 faces the first roller 41 with the laminated member therebetween). In the stamping unit 40, in a state without the laminated member or a die plate 43 (described below), the first roller 41 and the second roller 42 are in contact with each other with a predetermined pressure. The first roller 41 and the second roller 42 are rotationally driven clockwise and counterclockwise, respectively, in FIG. 2.

In the stamping unit 40, the outer circumferential surface of the first roller 41, which faces the laminate film 250 constituting the laminated member, is provided with the die plate 43, serving as an example opposing member, to form the grooves 260 (see FIG. 9) in the laminated member. In this exemplary embodiment, a magnet is provided inside the first roller 41. The die plate 43, which is formed of a magnetic material, is attracted to the first roller 41 due to a magnetic force and is fixed to the first roller 41. With this label printer 1, multiple types of multi-label sheet 300, which vary in the detail of the print images 240 and in the cutting shape of the labels 270, may be produced, and thus, the die plate 43 to be attached to the first roller 41 is replaced according to the type of the multi-label sheet 300 to be formed by the label printer 1. Hence, in this exemplary embodiment, there are multiple die plates 43.

The stamping unit 40 according to this exemplary embodiment further includes an image reading part 44 disposed so as to face the outer circumferential surface of the first roller 41 to read an image of the outer circumferential surface of the first roller 41 and an image of the die plate 43 mounted on the outer circumferential surface of the first roller 41. The image reading part 44, serving as an example reading device, is formed of a digital camera that uses, for example, a CCD image sensor or a CMOS image sensor.

Configuration of Die Plate

Figure 3A:
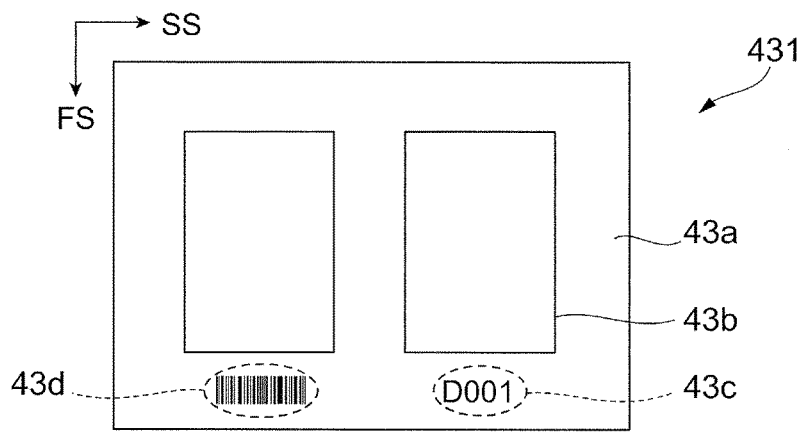
FIGS. 3A to 3C show configuration examples of a die plate used in the stamping unit.
Figure 3B:
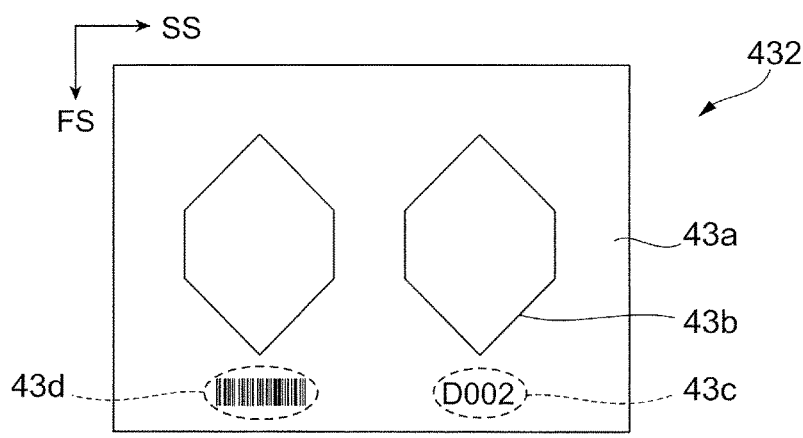

FIGS. 3A to 3O show configuration examples of the die plate 43 used in the stamping unit 40. FIG. 3A shows a first die plate 431, FIG. 3B shows a second die plate 432 having a different shape from the first die plate 431, and FIG. 3O shows a third die plate 433 having a different shape from the first die plate 431 and the second die plate 432.

In FIGS. 3A to 3O, the first die plate 431 to the third die plate 433 each include a flat part 43a formed of a rectangular metal plate (for example, a stainless steel plate), and projecting parts 43b projected from the flat part 43a toward the near side of the drawing, at portions corresponding to the positions of the grooves 260 (see FIG. 9). The first die plate 431 to the third die plate 433 each include a character image 43c, which is an image representing an ID (die plate ID) of its own in characters (in this example, an alphabet letter and Arabic numerals), and an identification image 43d, which is a code (in this example, a barcode) representing the same die plate ID as the character image 43c. The character image 43c and the identification image 43d may be formed either by providing grooves and projections, as the projecting parts 43b, or by printing.

In this example, when it is assumed that the clockwise direction of the first roller 41 in FIG. 2 is a second scanning direction SS and that the direction in which the shaft of the first roller 41 extends is a first scanning direction FS, the projecting parts 43b in each of the first die plate 431 to the third die plate 433 are configured such that two dies having the same shape are disposed side-by-side in the second scanning direction SS. Furthermore, in each of the first die plate 431 to the third die plate 433, the character image 43c and the identification image 43d are disposed at a position shifted from the projecting parts 43b in the first scanning direction FS (i.e., toward the end). Furthermore, in each of the first die plate 431 to the third die plate 433, the character image 43c and the identification image 43d are arranged side-by-side in the second scanning direction SS.

The first die plate 431 shown in FIG. 3A has two rectangular projecting parts 43b. The die plate ID of the first die plate 431 is "D001", as shown by the character image 43c in FIG. 3A, and the identification image 43d of the first die plate 431 contains this die plate ID, "D001".

The second die plate 432 shown in FIG. 3B has two hexagonal projecting parts 43b. The die plate ID of the second die plate 432 is "D002", as shown by the character image 43c in FIG. 3B, and the identification image 43d of the second die plate 432 contains this die plate ID, "D002".

Furthermore, the third die plate 433 shown in FIG. 3C has two projecting parts 43b having a square shape with rounded corners (hereinbelow, this shape may be referred to as, simply, "a square shape"). The die plate ID of the third die plate 433 is "D003", as shown by the character image 43c in FIG. 3C, and the identification image 43d of the third die plate 433 contains this die plate ID, "D003".

Configuration of Label Base

FIG. 4 shows the configuration of the label base 200 used in the label printer 1. As described above, the label base 200, serving as an example recording material, is wound on the feeding unit 10 and is used as the raw material when the multi-label sheet 300 is formed in the label printer 1. The label base 200 has such a belt shape that the length in the second scanning direction SS is larger than the length in the first scanning direction FS.

The label base 200 according to this exemplary embodiment includes a separator 210, serving as an example backing sheet; an adhesive layer 220 having adhesion and formed on one side (in FIG. 4, the top surface) of the separator 210; and a base member 230 disposed on the adhesive layer 220. The print images 240 are formed on and the laminate film 250 is stacked on the base member 230. In other words, the label base 200 according to this exemplary embodiment has a configuration in which the separator 210 and the base member 230 are joined together by the adhesive layer 220. In the label base 200, the base member 230 may be peeled off from the separator 210, and when the base member 230 is peeled off from the separator 210, the adhesive layer 220 adheres to the base member 230 (the adhesive layer 220 is less likely to adhere to the separator 210).

The separator 210 includes a peel-off base sheet 210a, serving as a base, and a peel-off material 210b disposed on one side (in FIG. 4, the top surface) of the peel-off base sheet 210a. The adhesive layer 220 adheres to the peel-off base sheet 210a. The peel-off base sheet 210a is formed of paper or the like that is strong enough to withstand the transportation in the image forming unit 20 or the like. On the other hand, in the label base 200, the peel-off material 210b is formed of an organic material or the like that has lower adhesion to the adhesive layer 220 than to the peel-off base sheet 210a and that has lower adhesion to the adhesive layer 220 than the adhesion between the adhesive layer 220 and the base member 230.

Furthermore, in the label base 200, the adhesive layer 220 is formed of an organic material or the like that has higher adhesion to the base member 230 than to the peel-off material 210b and that adheres to various materials (metal, wood, plastic, etc.).

The base member 230, on which the print images 240 are formed and the laminate film 250 is stacked, is formed of paper or the like. The color of the base member 230 is determined according to the client's request, and it may be either an achromatic color, such as white, or a monochromatic color other than the achromatic color. However, it is desirable that the color of the separator 210 (peel-off material 210b) and the color of the base member 230 be different, from the standpoint of the convenience of inspection performed on the basis of the image captured by the image capturing unit 60.

Configuration of Label-Forming Image

FIGS. 5A to 5C show configuration examples of a label-forming image used in the image forming unit 20. FIG. 5A shows a first label-forming image 21, FIG. 5B shows a second label-forming image 22 having different details from the first label-forming image 21, and FIG. 5C shows a third label-forming image 23 having different details from the first label-forming image 21 and the second label-forming image 22.

The image forming unit 20 according to this exemplary embodiment is a so-called page printer, which executes an image forming operation according to image data in which images are laid out on a page basis. Hence, the first label-forming image 21 to the third label-forming image 23 according to this exemplary embodiment each include ten print images 240 arranged in the second scanning direction SS, when formed on a sheet of A3 size (297 mm×420 mm) in portrait orientation.

In the first label-forming image 21 shown in FIG. 5A, ten first print images 241 (print images 240), each formed of a character image "1234", are arranged in the second scanning direction SS. In the second label-forming image 22 shown in FIG. 5B, ten second print images 242 (print images 240), each formed of a character image "AB", are arranged in the second scanning direction SS. Furthermore, in the third label-forming image 23 shown in FIG. 5C, ten third print images 243 (print images 240), each formed of a character image "α", are arranged in the second scanning direction SS. In this example, although the case where the first label-forming image 21 to the third label-forming image 23 each include ten print images has been described, the number of the print images forming one label-forming image may vary according to the size or the like of the labels 270 to be formed (see FIG. 6). Furthermore, in this example, although the first label-forming image 21 to the third label-forming image 23 each include ten print images 240 (first print images 241, second print images 242, or third print images 243), the configuration is not limited thereto, and each label-forming image may include, for example, a mark image used for positioning in the stamping unit 40. In other words, an image may be formed in the region other than the region constituting the labels 270 (see FIG. 6), that is, in the region constituting the waste label 280. In this exemplary embodiment, the data of the print images 240 (the first print images 241, the second print images 242, or the third print images 243) correspond to the image data.

Configuration of Multi-Label Sheet

FIGS. 6A to 6C show configuration examples of a multi-label sheet 300 obtained by using the label printer 1. FIG. 6A shows a first multi-label sheet 301, FIG. 6B shows a second multi-label sheet 302 different from the first multi-label sheet 301, and FIG. 6C shows a third multi-label sheet 303 having different details from the first multi-label sheet 301 and the second multi-label sheet 302.

The first multi-label sheet 301 shown in FIG. 6A is obtained by forming, in the image forming unit 20, multiple first print images 241 on the label base 200, using the first label-forming image 21 shown in FIG. 5A, and then die-cutting, in the stamping unit 40, the label base 200, using the first die plate 431 shown in FIG. 3A. The first multi-label sheet 301 has multiple rectangular labels 270, each having the first print image 241, arranged on the separator 210, in the second scanning direction SS.

The second multi-label sheet 302 shown in FIG. 6B is obtained by forming, in the image forming unit 20, multiple second print images 242 on the label base 200, using the second label-forming image 22 shown in FIG. 5B, and then die-cutting, in the stamping unit 40, the label base 200, using the second die plate 432 shown in FIG. 3B. The second multi-label sheet 302 has multiple hexagonal labels 270, each having the second print image 242, arranged on the separator 210, in the second scanning direction SS.

Figure 3C:
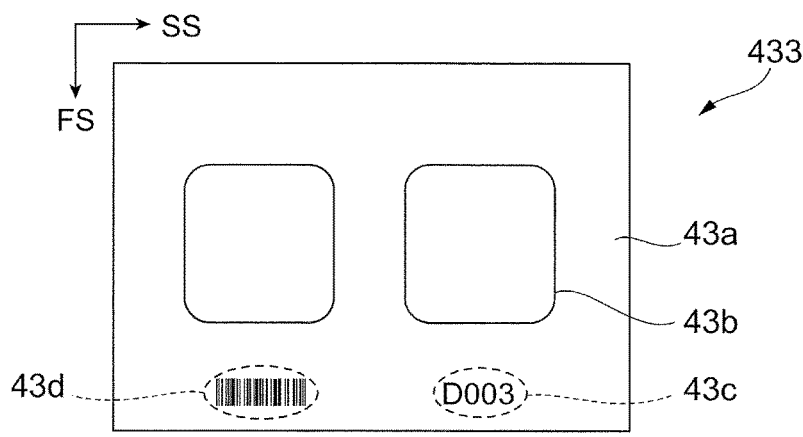

The third multi-label sheet 303 shown in FIG. 6C is obtained by forming, in the image forming unit 20, multiple third print images 243 on the label base 200, using the third label-forming image 23 shown in FIG. 5C, and then die cutting, in the stamping unit 40, the label base 200, using third die plate 433 shown in FIG. 3C. The third multi-label sheet 303 has multiple square labels 270, each having the third print image 243, arranged on the separator 210, in the second scanning direction SS.

Configuration of Control System

FIG. 7 is a diagram for explaining a control system of the label printer 1.

The controller 100 according to this exemplary embodiment includes a central processing unit (CPU) 101; a read-only memory (ROM) 102 that stores programs executed by the CPU 101, data used when the programs are executed, etc.; a random-access memory (RAM) 103 that stores data temporarily generated when the programs are executed, etc.; and an electrically erasable programmable read-only memory (EEPROM) 104 that stores data used when the programs are executed, is capable of rewriting the content of the data, and is capable of maintaining the stored content without needing a power supply. In this exemplary embodiment, the EEPROM 104 functions as an example storage part.

Information related to various instructions, received from a user, is input to the controller 100, via the instruction receiving unit 110. Read image data read by the image reading part 44, which is provided in the stamping unit 40, is input to the controller 100. Furthermore, captured image data captured by the image capturing unit 60 is input to the controller 100.

On the other hand, the controller 100 outputs control signals to each of the feeding unit 10, the image forming unit 20, the laminating unit 30, the stamping unit 40, and the separating unit 50. The controller 100 also outputs control signals to each of the defective-label peel-off unit 70, the winding unit 80, the first buffer 91, the second buffer 92, and the third buffer 93.

Process of Producing Multi-Label Sheet

A process of producing the multi-label sheet 300 by using the label printer 1 shown in FIG. 1 will be described.

The label base 200 is fed from the feeding unit 10 to the image forming unit 20, via the first buffer 91. The image forming unit 20 forms print images 240 based on a label-forming image, on the base member 230 of the label base 200.

The label base 200 having the print images 240 formed thereon is fed from the image forming unit 20 to the laminating unit 30. The laminating unit 30 attaches a laminate film 250 to the base member 230 of the label base 200, on which the print images 240 have been formed.

The label base 200 (the laminated member including the print images 240) to which the laminate film 250 has been attached is fed to the stamping unit 40 via the second buffer 92. The stamping unit 40 forms grooves 260 (see FIG. 9) in the laminated member, using the die plate 43 mounted on the first roller 41.

The laminated member provided with the grooves 260 is fed to the separating unit 50 via the third buffer 93. The separating unit 50 peels off a waste label 280 from the laminated member, using the grooves 260 as boundaries, thereby separating the laminated member into a multi-label sheet 300 and the waste label 280. The separating unit 50 winds the waste label 280 separated from the multi-label sheet 300. The thus-wound waste label 280 will be discarded.

The multi-label sheet 300 separated from the waste label 280 is fed to the image capturing unit 60. The image capturing unit 60 captures an image of the surface of the multi-label sheet 300 on which the print images 240 are formed (i.e., the surface on which the labels 270 are formed).

The multi-label sheet 300 after passing through the image capturing unit 60 is fed to the defective-label peel-off unit 70. The defective-label peel-off unit 70 peels off (removes), from the multi-label sheet 300, labels 270 that have been determined to be defective, on the basis of the result of the inspection performed by the controller 100 using the captured image data obtained by the image capturing unit 60 capturing the image of the multi-label sheet 300.

The multi-label sheet 300 after passing through the defective-label peel-off unit 70 is fed to the winding unit 80. The winding unit 80 winds, in a roll, the multi-label sheet 300 fed thereto.

The multi-label sheet 300 formed of the label base 200 is produced in this way.

Example Process of Producing Multi-Label Sheet

Next, an example process of producing the multi-label sheet 300 described above will be described. Herein, a case of producing the third multi-label sheet 303, shown in FIG. 6C, serving as the multi-label sheet 300, will be described. Hence, in this example, after multiple third print images 243, shown in FIG. 5C, are formed, in the image forming unit 20, on the label base 200, serving as the raw material, using the third label-forming image 23, the label base 200 is cut with the third die plate 433, shown in FIG. 3C, in the stamping unit 40.

FIGS. 8A to 8C and 9A to 9C are diagrams for explaining a process of producing the third multi-label sheet 303 by using the label printer 1. In FIGS. 8A to 8C and FIGS. 9A to 9C, the upper diagrams show top views of the label base 200, and the third multi-label sheet 303 and the waste label 280, which are obtained from the label base 200, and the lower diagrams show sectional views thereof.

FIG. 8A shows the label base 200 wound on the feeding unit 10. As described above, the label base 200 according to this exemplary embodiment is formed of the separator 210, the adhesive layer 220, and the base member 230 stacked in this order from the bottom.

FIG. 8B shows the label base 200 having the third print images 243 formed thereon by the image forming unit 20. In this example, multiple third print images 243 based on the third label-forming image 23 are formed on the base member 230 of the label base 200 so as to be arranged in the second scanning direction SS.

FIG. 8C shows the label base 200 having the laminate film 250 attached thereto by the laminating unit 30 (i.e., the laminated member composed of the label base 200, the third print images 243, and the laminate film 250). In this example, the laminate film 250 is attached to the base member 230 of the label base 200 and the multiple third print images 243 formed on the base member 230. Because the laminate film 250 in this exemplary embodiment is transparent in the visible range, in the laminated member shown in FIG. 8C, the multiple third print images 243 may be seen through the laminate film 250.

FIG. 9A shows the label base 200 (the laminated member composed of the label base 200, the third print images 243, and the laminate film 250) having grooves 260 formed by the stamping unit 40. In this example, the grooves 260 that penetrate through the laminate film 250, the base member 230, and the adhesive layer 220 but not the separator 210 are formed in the laminated member, using the projecting parts 43b of the third die plate 433 attached to the first roller 41. By positioning the laminated member before forming the grooves 260, endless grooves 260 (in the shape of a square with rounded corners) are formed in the laminated member so as to enclose the third print images 243.

FIG. 9B shows the third multi-label sheet 303 obtained by separating, by the separating unit 50, the laminated member shown in FIG. 9A. In this example, using the grooves 260 as boundaries, a portion of the laminate member composed of the laminate film 250, the base member 230, and the adhesive layer 220, the portion outside the third print images 243, is separated, as the waste label 280, from the laminated member. As a result, the third multi-label sheet 303 includes the separator 210 and the multiple labels 270 arranged side-by-side, in the second scanning direction SS, on the separator 210. Each of the multiple labels 270 constituting the third multi-label sheet 303 includes the adhesive layer 220 on the separator 210, the base member 230 on the adhesive layer 220, the third print image 243 on the base member 230, and the laminate film 250 on the base member 230 and on the third print images 243.

FIG. 9C shows the waste label 280 obtained by separating, by the separating unit 50, the laminated member shown in FIG. 9A. This waste label 280 includes the adhesive layer 220, the base member 230 on the adhesive layer 220, and the laminate film 250 on the base member 230. The waste label 280 has through-holes at positions corresponding to the positions of the labels 270 and has a continuous shape extending in the second scanning direction SS.

[Determining if Execution of Label Printing is Allowed]

As described above, the label printer 1 according to this exemplary embodiment has, for the purpose of manufacturing multiple types of multi-label sheets 300 (for example, the first multi-label sheet 301 to the third multi-label sheet 303), multiple label-forming images (print images 240) to be used in the image forming unit 20 and multiple die plates 43 to be used in the stamping unit 40. However, for example, when producing the third multi-label sheet 303, if the third print images 243, which are formed of the character "α", are not formed by using the third label-forming image 23, and if the grooves 260 in the shape of a square with rounded corners are not formed by using the third die plate 433, a multi-label sheet 300 different from the third multi-label sheet 303 (i.e., a multi-label sheet 300 having different details of the print images 240 of the labels 270 and/or a different shape of the labels 270) will be obtained.

Furthermore, in the label printer 1 according to this exemplary embodiment, images of the multiple labels 270 on the multi-label sheet 300, obtained by removing the waste label 280 from the laminated member, are captured with the image capturing unit 60 and are compared with a target image (referred to as an "inspection image") for these labels 270, and the controller 100 determines, on the basis of the result of comparison, if the labels 270 are defective (if the labels 270 are to be peeled off in the defective-label peel-off unit 70). However, for example, when producing the third multi-label sheet 303, if the structure (the detail of the images and the shape) of the labels 270 constituting the third multi-label sheet 303 does not match the structure of the inspection image, non-defective labels 270 are to be peeled off in the defective-label peel-off unit 70.

Hence, in the label printer 1 according to this exemplary embodiment, when producing the multi-label sheet 300, the information on the die plate 43 mounted on the first roller 41 of the stamping unit 40 is acquired, and, if the die plate 43 that is assumed to be used is not mounted, the production of the multi-label sheet 300 is prohibited. Furthermore, in the label printer 1 according to this exemplary embodiment, when producing the multi-label sheet 300, an inspection image corresponding to the labels 270 to be subsequently produced is prepared.

Figure 10A:
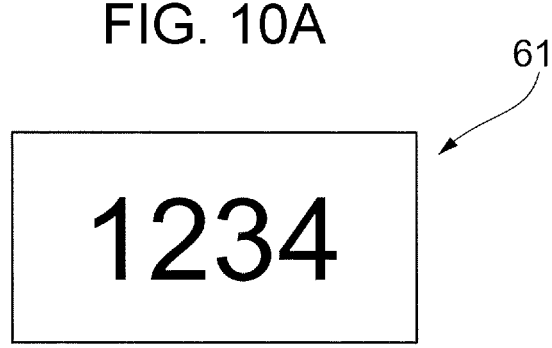
FIGS. 10A to 10C show configuration examples of an inspection image.
Figure 10B:
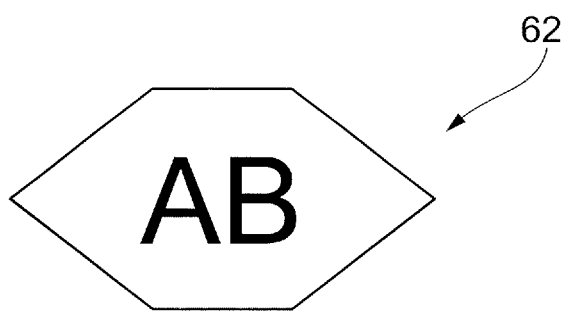
Figure 10C:
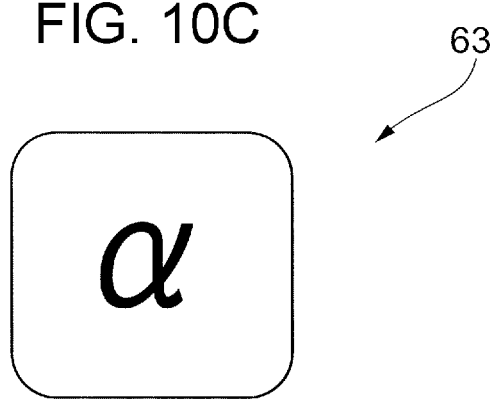

FIGS. 10A to 10C show configuration examples of an inspection image, serving as an example reference image. FIG. 10A shows a first inspection image 61 to be used for inspecting the first multi-label sheet 301 shown in FIG. 6A, FIG. 10B shows a second inspection image 62 to be used for inspecting the second multi-label sheet 302 shown in FIG. 63, and FIG. 10C shows a third inspection image 63 to be used for inspecting the third multi-label sheet 303 shown in FIG. 6C.

In the first inspection image 61 shown in FIG. 10A, a character image "1234" corresponding to the first print images 241 is disposed at the center of a rectangular surface corresponding to the projecting part 43b of the first die plate 431. In the second inspection image 62 shown in FIG. 10B, a character image "AB" corresponding to the second print images 242 is disposed at the center of a hexagonal surface corresponding to the projecting part 43b of the second die plate 432. In the third inspection image 63 shown in FIG. 10C, a character image "α" corresponding to the third print images 243 is disposed at the center of a square surface corresponding to the projecting parts 43b of the third die plate 433.

FIG. 11 shows a configuration example of a label information table registered in the label printer 1 in advance by a user. The label information table is stored in the EEPROM 104 (see FIG. 7) provided in the controller 100.

The label information table shown in FIG. 11 contains label IDs given to the respective multi-label sheets 300 to be produced, print image IDs given to the respective label-forming images, die plate IDs given to the respective die plates 43, inspection image IDs given to the respective inspection images, and the uses of the respective multi-label sheets 300, which are associated with one another.

The label information table shown in FIG. 11 contains three label IDs. Although this example shows a case where three label IDs are registered, the number of label IDs may be less than three or more than three.

For the label ID "L001 (first multi-label sheet 301)", the print image ID is set to "P001 (first label-forming image 21)", the die plate ID is set to "D001 (first die plate 431)", the inspection image ID is set to "I001 (first inspection image 61)", and the use is set to "product X".

For the label ID "L002 (second label)", the print image ID is set to "P002 (second label-forming image 22)", the die plate ID is set to "D002 (second die plate 432)", the inspection image ID is set to "I002 (second inspection image 62)", and the use is set to "product Y".

Furthermore, for the label ID "L003 (third label)", the print image ID is set to "P003 (third label-forming image 23)", the die plate ID is set to "D003 (third die plate 433)", the inspection image ID is set to "I003 (third inspection image 63)", and the use is set to "product Z".

The label-forming image (herein, the first label-forming image 21 to the third label-forming image 23) data associated with the respective print image IDs and the inspection image (herein, the first inspection image 61 to the third inspection image 63) data associated with the respective inspection image IDs are stored in the EEPROM 104 (see FIG. 7) provided in the controller 100.

Figure 12:
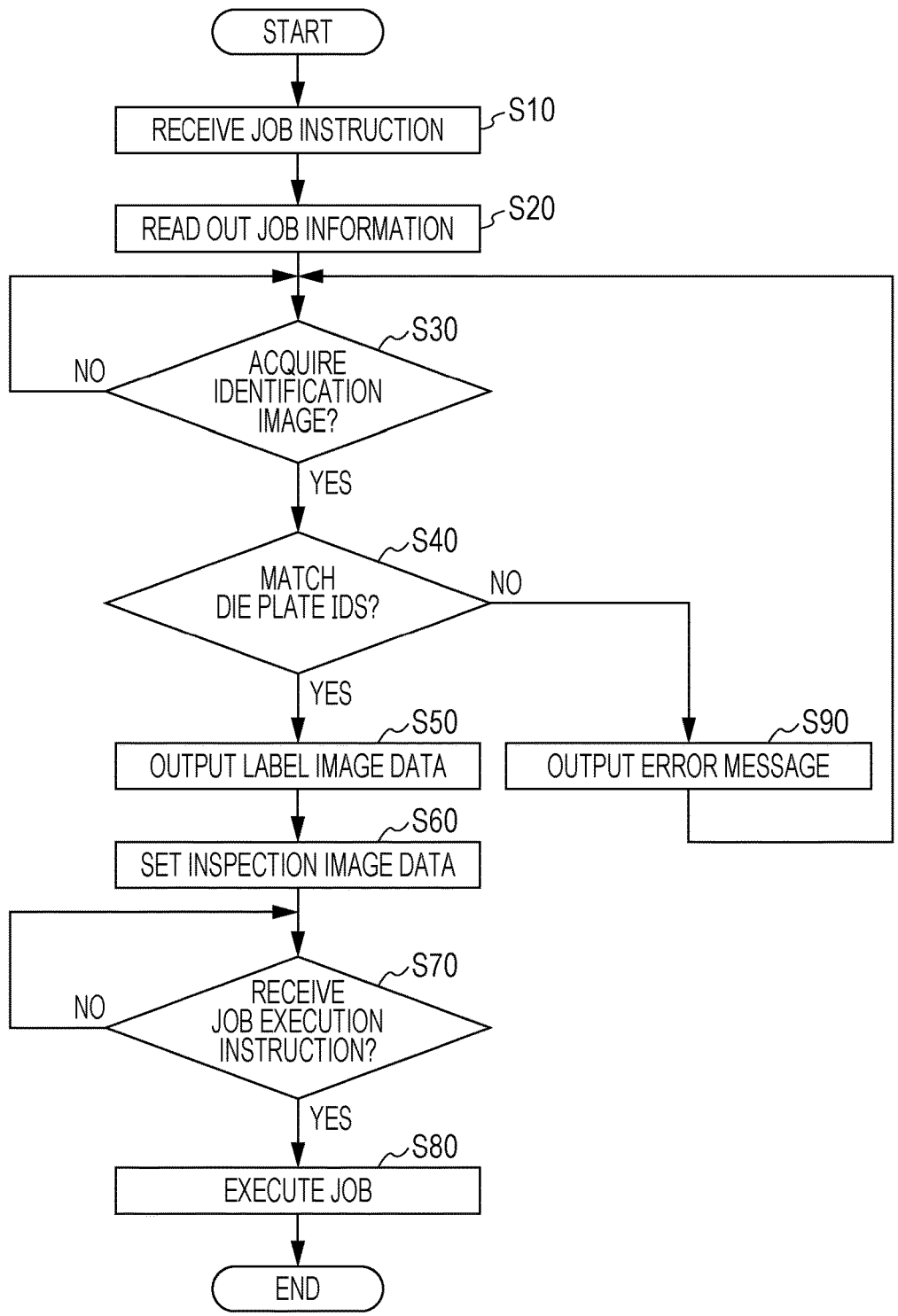
FIG. 12 is a flowchart of the process of determining if execution of label printing in the label printer is allowed.

FIG. 12 is a flowchart of the process of determining if execution of label printing in the label printer 1 is allowed.

In this processing, first, the controller 100 receives a job instruction from a user via the instruction receiving unit 110 (step S10). Although the job instruction may include, for example, the label ID, the use may be included, instead of the label ID.

Next, the controller 100 extracts the label ID (or the use) from the job instruction received in step S10 and reads out the job information (the print image ID, the die plate ID, and the inspection image ID) associated with the extracted label ID from the label information table (see FIG. 11) that is read out from the EEPROM 104 (step S20).

Subsequently, the controller 100 determines if the identification image 43d provided on the die plate 43 was acquired, from the image captured by the image capturing unit 60 (step S30). When it is determined to be NO in step S30, step S30 is repeated.

When it is determined to be YES in step S30, the controller 100 extracts the die plate ID embedded in the identification image 43d acquired in step S30 and determines if the extracted die plate ID and the die plate ID read out in step S20 match (step S40).

When it is determined to be YES in step S40, that is, when the die plate IDs match, the controller 100 outputs, to the image forming unit 20, the label-forming image data associated with the print image ID read out in step S20 (step S50).

Then, the controller 100 sets the inspection image data associated with the inspection image ID, which was read out in step S20, in the controller 100 (step S60).

Note that step S50 and step S60 may be performed reversely or simultaneously.

Then, the controller 100 determines if a job execution instruction from the user is received via the instruction receiving unit 110 (step S70). When it is determined to be NO in step S70, step S70 is repeated.

When it is determined to be YES in step S70, the controller 100 executes a job for producing the intended multi-label sheet 300 by using the label printer 1, thus completing the processing (step S80).

Note that, when it is determined to be NO in step S40, the controller 100 outputs, to a display device (not shown) provided in the label printer 1, an error message informing mismatch between the die plate IDs, that is, an error message informing that the die plate 43 matching the shape of the labels 270 to be produced is not mounted on the first roller 41 of the stamping unit 40 (step S90) and continues processing from step S30. This error message displayed on the display device (not shown) informs the user of a fact that a wrong die plate 43 is attached to the first roller 41 of the stamping unit 40. The error message does not need to be displayed in the form of an image, but may be output in the form of voice. In this case, instead of the error message, an error sound may be output.

When the die plate 43 is not mounted on the first roller 41 of the stamping unit 40, a decision of NO is made in step S30, and hence, it is impossible to start production of the multi-label sheet 300 (the label production is prohibited). Furthermore, when a die plate 43 different from the die plate 43 that is assumed to be used is mounted on the first roller 41 of the stamping unit 40 (i.e., when the die plate IDs do not match), a decision of NO is made in step S40. Also in this case, it is impossible to start production of the multi-label sheet 300 (the label production is prohibited).

In this example, the actually obtained labels 270 are inspected using the inspection image associated with the detail of the multi-label sheet 300 to be produced. Hence, situations in which non-defective labels 270 that are erroneously determined to be defective are peeled off from the multi-label sheet 300 by the defective-label peel-off unit 70, due to the use of an inspection image different from the labels 270 to be produced, are reduced.

Other Configurations

In this exemplary embodiment, although the identification image 43d of the die plate 43 mounted on the first roller 41 is read with the image reading part 44 in the stamping unit 40, the configuration is not limited thereto, and the character image 43c of the die plate 43 may be read.

In this exemplary embodiment, although the image reading part 44 is disposed at a fixed position so as to face the first roller 41 (and the die plate 43 mounted on the first roller) in the stamping unit 40, the configuration is not limited thereto. For example, a so-called handy scanner, which is a scanner held by a user's hand, may be used as the image reading part 44. If the configuration of this exemplary embodiment is employed, it is difficult to read the die plate 43 that is not mounted on the first roller 41. However, the occurrence of erroneous detection will be reduced.

Furthermore, in this exemplary embodiment, although the die plate ID of the die plate 43 is acquired from the read image data obtained by reading, with the image reading part 44, the identification image 43d of the die plate 43 mounted on the first roller 41 of the stamping unit 40, the configuration is not limited thereto. For example, the die plate 43 may have a radio-frequency identification (RFID) tag having a die plate ID embedded therein, and the die plate ID may be acquired from the RFID tag.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a setting part that sets image data;
an image forming part that forms an image based on the image data on a base member of a recording material formed by attaching the base member to a backing sheet;
a groove forming part having an opposing member mounted on a portion facing the base member of the recording material that has an image formed by the image forming part, the groove forming part urging a projecting part formed on the opposing member against the recording material to form a groove in the base member;
an acquisition part that acquires a type of the opposing member mounted on the groove forming part;

a storage part that stores a content of the image data and the type of the opposing member in an associated manner; and a control part that controls an image forming operation performed by the image forming part, on the basis of the association between the content of the image data and the type of the opposing member stored in the storage part in an associated manner.

2. The image forming apparatus according to claim 1, wherein the control part prohibits the image forming part from performing the image forming operation when the content of the image data set by the setting part and the type of the opposing member acquired by the acquisition part do not match the association stored in the storage part.

3. The image forming apparatus according to claim 1, wherein the control part permits the image forming operation performed by the image forming part when the content of the image data set by the setting part and the type of the opposing member acquired by the acquisition part match the association stored in the storage part.

4. The image forming apparatus according to claim 2, wherein the control part permits the image forming operation performed by the image forming part when the content of the image data set by the setting part and the type of the opposing member acquired by the acquisition part match the association stored in the storage part.

5. The image forming apparatus according to claim 1, further comprising an image capturing part that captures an image of the opposing member mounted on the groove forming part, wherein the acquisition part acquires the type of the opposing member from an image capturing result obtained by capturing an image of the opposing member with the image capturing part.

6. The image forming apparatus according to claim 1, further comprising:

a removing part that removes a part of the base member from the recording material having a groove formed therein by the groove forming part, by using the groove as a boundary;

a reading device that reads a base member side of the recording material from which a part of the base member has been removed by the removing part;

a determination part that determines if the base member and the image formed on the base member are defective, from the reading result obtained by reading the recording material with the reading device; and a peel off part that peels off the base member and the image that are determined to be defective from the recording material, on the basis of the result of determination performed by the determination part.

7. The image forming apparatus according to claim 6, wherein the storage part further stores a reference image, serving as a reference for determining, in the determination part, if the image is defective, so as to be associated with the content of the image data and the type of the opposing member, and wherein the determination part determines if the recording material and the image are defective by using the reference image stored in the storage part and the reading result obtained by the reading device.

* * * * *